May 27, 1924.
H. J. TWEED
DIRIGIBLE HEADLIGHT
Filed Aug. 24, 1923
1,495,822
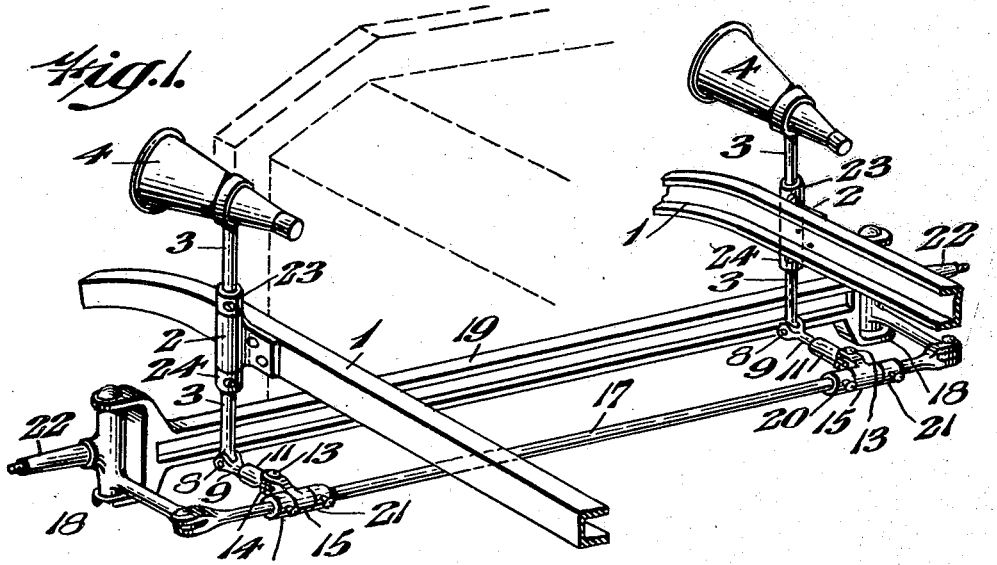
Fig. 1.
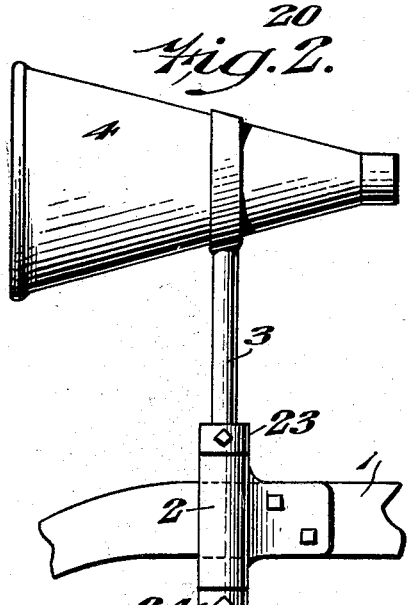
Fig. 2.
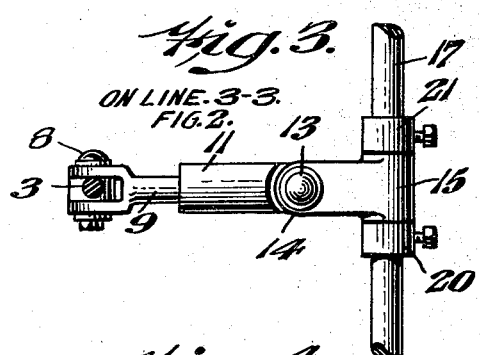
Fig. 3.
ON LINE 3-3.
FIG. 2.
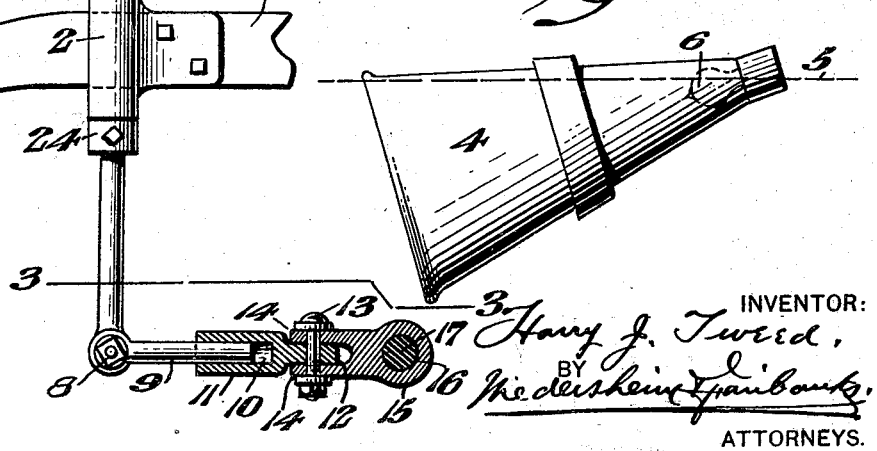
Fig. 4.
INVENTOR:
Harry J. Tweed,
BY
ATTORNEYS.

Patented May 27, 1924.

1,495,822

UNITED STATES PATENT OFFICE.

HARRY J. TWEED, OF AUDUBON, NEW JERSEY.

DIRIGIBLE HEADLIGHT.

Application filed August 24, 1923. Serial No. 659,087.

*To all whom it may concern:*

Be it known that I, HARRY J. TWEED, a citizen of the United States, residing in the city of Audubon, county of Camden, State of New Jersey, have invented a new and useful Dirigible Headlight, of which the following is a specification.

My invention relates to a novel actuating mechanism for dirigible or automatic headlights for vehicles, which are governed by the operation of the steering apparatus of the vehicle, so as automatically to turn with or follow simultaneously the movement of the front wheels and throw their rays in the direction of the movement or path of the vehicle, when the latter is turning in either direction.

The principal object of my invention is the construction of a headlight actuating mechanism of the foregoing class, simple and inexpensive in character and readily applicable to automobiles of a conventional type and without involving structural changes.

A further object of my invention is the construction of such a connection between the steering gear of the vehicle and the mounting of the headlights, as will assure uniform movement of said headlights without regard to the upward or downward, or irregular, movements of the steering apparatus, when the vehicle is passing over uneven ground,—the connection being of such a character as to compensate for any lost motion or play of the connecting-rod without affecting the headlights.

A further object of my invention is the construction, application, and connection with both the dirigible lights and the steering gear, of a compound adjustable headlight-operating mechanism of the character hereinafter particularly described, which will transmit a movement of unusual flexibility from the steering apparatus to the lights.

A further object relates to the detail of construction and mounting of the headlights themselves, their reflecting surfaces and their mounting, with relation both to the vehicle and to the steering apparatus with which they are connected, so as to assure at all times the proper disposition or reflection of the light with respect to the road level.

With the foregoing, and other, objects in view, my invention comprehends such novel features of construction, combination and arrangement of parts as are hereinafter described and particularly pointed out in the claim.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a preferred embodiment of my dirigible automatic headlight operating mechanism showing also a portion of the chassis of a motor vehicle and its steering gear.

Figure 2 represents a side elevation partly in section of the connecting headlight-operating mechanism between the lights and the steering apparatus.

Figure 3 represents a section on line 3—3, Figure 2.

Figure 4 represents a side elevation of a headlight, showing a slightly modified form in which the headlight is arranged at an inclination to the horizontal.

Similar numerals of reference indicate corresponding parts.

In the drawings, 1 designates the side channels of a vehicle chassis, to which is attached by any convenient means a vertically-disposed, bracket or tubular bearing 2, through which passes a headlight-carrying rod 3, to the upper end of which is attached, by any suitable means, a headlight 4 of any conventional type, and illustrated in Figure 4, in the direction in which it is preferably disposed with reference to the horizontal plane 5.

Each of the headlights 4, and their adjuncts as well as the connecting mechanism for actuating them, being duplicates, a description of one will suffice for both.

The headlight, as illustrated in Figure 4, is inclined downwardly in such a direction or angle that the reflection of its light-bulb 6 is downward and beneath the outer upper portion of the cone, which is lower than the level of the light, so that the direct rays from said light are deflected downwardly from the eyes of an approaching driver.

I preferably line the inner surface of my reflector with a white enameled surface, which I have found to be preferable to the ordinary nickel plated reflector commonly employed.

The lower end of each headlight rod 3 is pivotally connected by the bolt 8 to the slide rod 9, extending horizontally into a socket 10 formed within a laterally disposed head 11, the opposite end of which is formed with a tongue 12 fitted and pivoted at 13 between ears 14 extending forwardly and laterally from the rocking-bearing 15, transversely bored as at 16, and loosely mounted upon the connecting rod 17 of the usual character, which actuates the knuckle-joints 18 on the front axle 19 of the vehicle.

This rocking-bearing 15 is maintained against endwise movement on the connecting rod 17, by collars 20 and 21 fixedly secured upon said connecting rod.

It will be understood that the rod 17 is connected to and actuated by any conventional steering mechanism, which I have not deemed necessary to show or describe in detail, it being understood that any longitudinal movement of said rod effects the desired actuation of the stub axles 22 in unison.

It will be apparent that since the members 15 are loosely mounted on the rod 17, they are capable of an up and down rocking movement. The head 11 by reason of its pivotal, laterally movable connection with the ears of the member 15, has a free lateral and also an up and down movement. The rod 9 by its slidable engagement with the head 11 has a free forward and backward movement, and in addition a free lateral and rocking or up and down movement so that a proper play or compensating connection is provided in all directions for the rods 9, whereby the desired rotary movement in either direction can be imparted to the rods 3 and the headlights 4 carried thereby.

It will thus be seen that the longitudinal movement in either direction of the rod 17, will be imparted simultaneously to the axles 22 and the headlights 4, so that the latter will be turned simultaneously with the movement of the front wheels of the automobile or other vehicle, so as to throw their rays always forwardly in the path of the vehicle, whether it is turning to the right or the left.

The position of the headlight rods 3, can be readily adjusted by the collars 23 and 24, and the position of the rocking members 15, on the rod 17 can also be readily adjusted by the collars 20 and 21.

My device can be readily adapted to any conventional self-propelled vehicle, and since it comprises but a few parts, it can be readily installed in place and will be found to be durable and efficient under all conditions.

It will now be apparent that I have devised a novel and useful dirigible headlight which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim and desire to secure by Letters Patent is:—

In a device of the character stated, the combination of a connecting rod, adapted to be actuated by steering mechanism, a pair of loosely mounted rocking members, supported on opposite ends thereof, each of said rocking members being provided at their forward ends with a bifurcated portion, adjustable collars carried by said rod for preventing said members from lateral movement, a pair of heads each having a socket and a rear tongue which tongues engage the bifurcated portions of said rocking members, a pivot removably securing each head to a rocking member, slide rods having their rear ends slidably mounted in the sockets of said heads, vertically disposed headlight rods, having their bottom ends pivotally connected to the front ends of said slide rods, a chassis, brackets secured to opposite sides of said chassis and forming bearings for said vertical rods, upper and lower collars adjustably carried by said rods and disposed above and below said brackets to permit vertical adjustment of said rods including headlights and headlights carried by said vertical rods.

HARRY J. TWEED.

Witnesses:
H. J. MacKintosh,
Harry W. Bowers,
Joseph H. Chamberlin.